(12) United States Patent
Senatori (10) Patent No.: US 8,520,377 B2
(45) Date of Patent: Aug. 27, 2013

(54) ELECTRONIC DEVICE ADJUSTABLE DISPLAY MEMBER

(75) Inventor: Mark David Senatori, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1415 days.

(21) Appl. No.: 11/799,250

(22) Filed: May 1, 2007

(65) Prior Publication Data

US 2008/0271288 A1 Nov. 6, 2008

(51) Int. Cl.
*H05K 5/00* (2006.01)
*H05K 7/00* (2006.01)
*G06F 1/16* (2006.01)

(52) U.S. Cl.
USPC ............ 361/679.27; 361/679.26; 361/679.55; 361/679.57; 361/679.58

(58) Field of Classification Search
USPC .......... 361/681, 683, 679.04, 679.26, 679.27, 361/679.55, 679.57, 679.58
See application file for complete search history.

(56) References Cited

U.S. PATENT DOCUMENTS

| | | | |
|---|---|---|---|
| 6,262,885 B1 | 7/2001 | Emma et al. | |
| 6,353,529 B1 * | 3/2002 | Cies | 361/681 |
| 6,430,038 B1 * | 8/2002 | Helot et al. | 361/681 |
| 6,504,707 B2 | 1/2003 | Agata et al. | |
| 6,665,175 B1 | 12/2003 | DeBoer et al. | |
| 6,778,196 B2 | 8/2004 | Nakamura | |
| 6,903,927 B2 | 6/2005 | Anlauff | |
| D528,541 S | 9/2006 | Maskatia | |
| 2002/0145847 A1 * | 10/2002 | Crosby | 361/683 |
| 2003/0103324 A1 | 6/2003 | Gallivan | |
| 2004/0090742 A1 | 5/2004 | Son et al. | |
| 2004/0114319 A1 | 6/2004 | Hill et al. | |
| 2005/0052833 A1 * | 3/2005 | Tanaka et al. | 361/681 |
| 2005/0128695 A1 * | 6/2005 | Han | 361/683 |

FOREIGN PATENT DOCUMENTS

| | | |
|---|---|---|
| DE | 20104209 | 6/2001 |
| EP | 1645939 | 4/2006 |
| JP | 2002-222026 | 8/2002 |
| KR | 10-2006-0089439 | 8/2006 |
| WO | 2005-064436 | 7/2005 |
| WO | WO2005/064436 | 7/2005 |

OTHER PUBLICATIONS

DE Office Action dated Dec. 14, 2009, pp. 4.
Intellectual Property Office, Examination Report under Section 18(3), Appln No. 0919692.4, date of mailing May 3, 2011, 3 p.
DE Office Action, Appln No. 112008001127.3, date mailed Oct. 18, 2010, pp. 3.
CN Office Action, Appln No. 200880014338.6, date of mailing Nov. 4, 2011, 4 p.
Translation of CN Office Action, Appln No. 200880014336.6, date of mailing Nov. 4, 2011, 3 p.

* cited by examiner

*Primary Examiner* — Anthony Haughton (57) ABSTRACT

An electronic device, comprising a hinge arm having a display member rotatably coupled to one end thereof, the hinge arm rotatably coupled at an opposite end thereof to a base member, and a locking system configured to prevent rotation of the hinge arm relative to the base member based on an angular location of the display member relative to the hinge arm.

20 Claims, 8 Drawing Sheets

ELECTRONIC DEVICE ADJUSTABLE DISPLAY MEMBER

BACKGROUND

Electronic devices, such as laptop or notebook computers, comprise a display member rotatably coupled to a base member about two or more pivot points. For example, in some notebook computers, the display member is pivotably coupled to an arm that is pivotably coupled to the base member to enable variable positioning about two pivot points. Such pivot points are simultaneously pivotable, oftentimes making it difficult to control the movement of the display member. In some instance it is possible to rotate the display member when the display member is not in a position to clear other parts of the system; thus, the display member will be prevented from rotating to the final desired position and/or will interfere with and/or potentially damage other parts of the system (e.g., the keypad on the base member). Furthermore, since both pivots are simultaneously rotatable, a user must use both hands to transition the display member to a desired orientation. For example, one hand must be used to stabilize and/or otherwise prevent rotation of one pivot point while manipulating the other pivot point to the desired position.

DETAILED DESCRIPTION OF THE DRAWINGS

Figure 1:
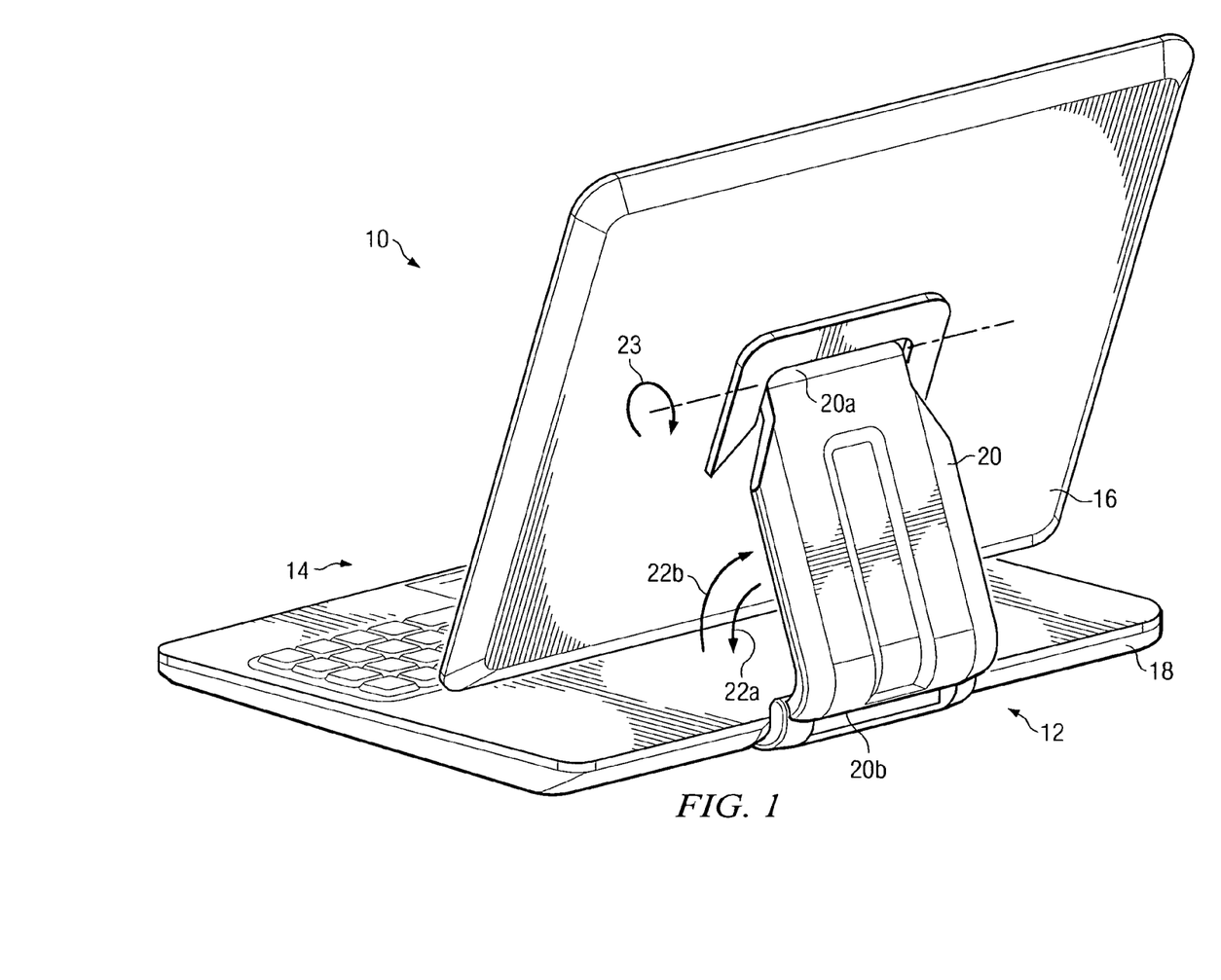
FIG. 1 is a diagram of an electronic device employing an embodiment of an adjustable display member to advantage.

FIG. 1 is a diagram of an electronic device 10 employing an embodiment of an adjustable display member 16 to advantage. In the embodiment illustrated in FIG. 1, electronic device 10 comprises a laptop or notebook computer 14; however, it should be understood that electronic device 10 may comprise any type of electronic device such as, but not limited to, a tablet personal computer or any other type of portable or non-portable electronic device. In the embodiment illustrated in FIG. 1, electronic device 10 comprises display member 16 rotatably coupled to a base member 18 via a hinge assembly 12. In FIG. 1, hinge assembly 12 comprises a hinge arm 20 having an end 20a pivotably coupled to display member 16 and an end 20b pivotally coupled to base member 18 to facilitate pivotable movement of hinge arm 20 relative to base member 18 and pivotable movement of display member 16 relative to hinge arm 20. For example, in the embodiment illustrated in FIG. 1, hinge assembly 12 facilitates pivotable movement of hinge arm 20 the directions of arrow 22 while also facilitating pivotable movement of display member 16 relative to hinge arm 20 in the directions of arrow 23. In operation, embodiments of hinge assembly 12 are configured to prevent pivotable movement of display member 16 and/or hinge arm 20 depending on the position(s) of display member 16 and/or hinge arm 20 to eliminate unwanted and/or damaging contact between display member 16 and base member 18.

Figures 2A, 2B:
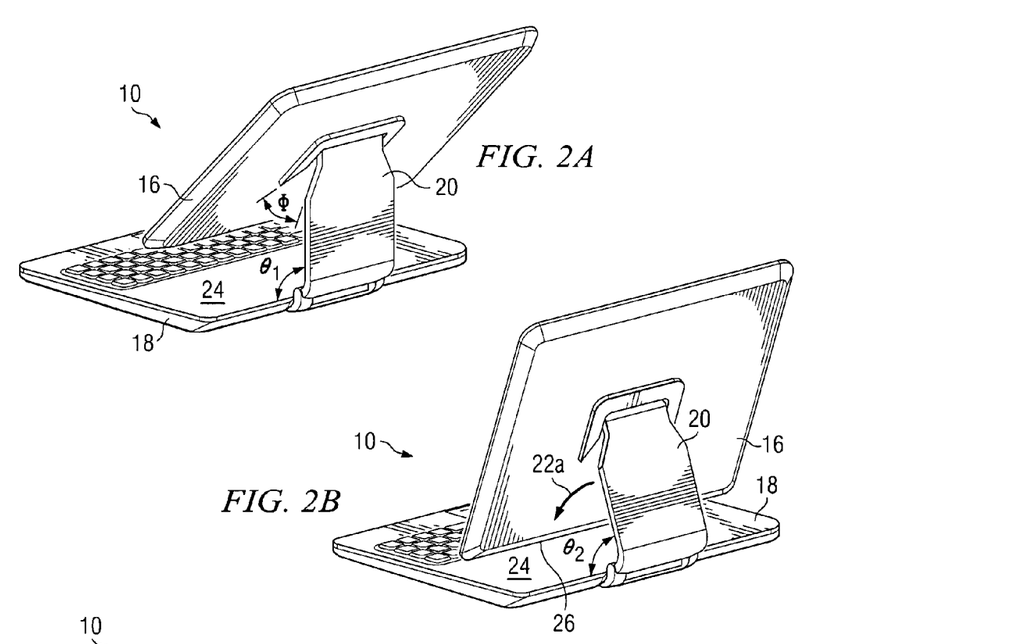
FIGS. 2A-2D are diagrams illustrating perspective views of the electronic device and adjustable display member of FIG. 1 transitioning from the open position to the closed position.
Figures 2C, 2D:
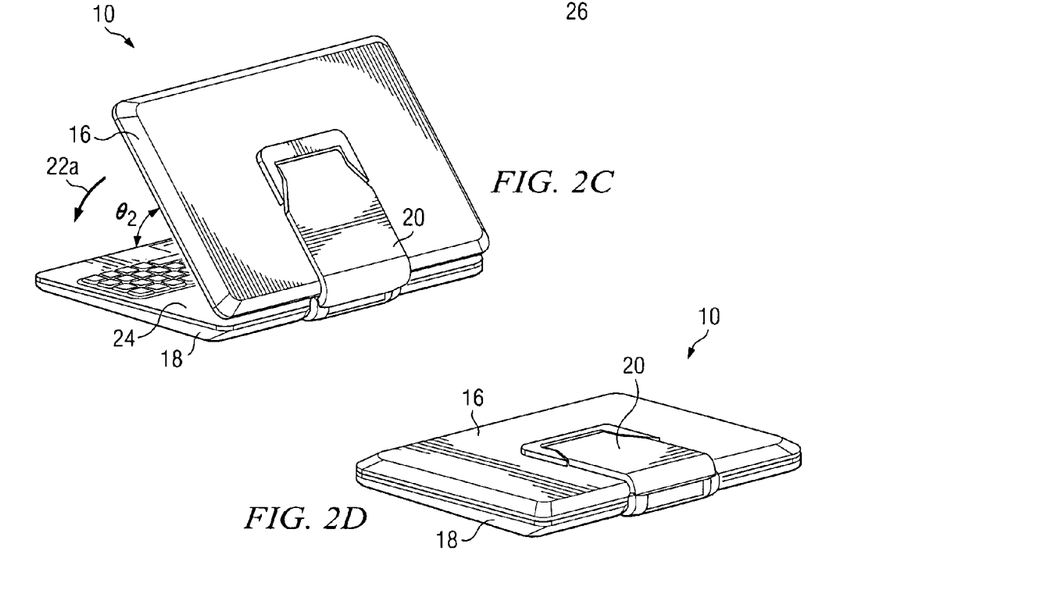

FIGS. 2A-2D are diagrams illustrating perspective views of electronic device 10 of FIG. 1 transitioning from an open position (FIG. 2A) to a closed position (FIG. 2D). In the embodiment illustrated in FIG. 2A, hinge arm 20 is extended generally upright from base member 18 at an angle $\theta_1$ of approximately ninety degrees relative to base member 18, and display member 16 is rotated at an angle $\Phi$ of approximately forty-five degrees relative to hinge arm 20. In FIGS. 2A-2D, hinge arm is rotatable through a range of angular positions extending from angle $\theta_1$ of approximately ninety degrees to an angle of approximately zero degrees relative to base member 18 (closed position illustrated in FIG. 2D); however, it should be understood that the angular positions of hinge arm 20 relative to base member 16 may be varied. In FIGS. 2A-2D, display member 16 is rotatable through a range of angular positions extending from a position coplanar with hinge arm 20 (FIGS. 2C and 2D) to an angle $\Phi$ of approximately forty-five degrees (FIG. 2B), however, it should be understood that display member 16 may be coupled to hinge arm 20 to facilitate positioning at other angular positions.

In operation, to position electronic device 10 in the closed position, hinge arm 20 is rotated in the direction of arrow 22a (FIG. 2B) until hinge arm 20 is positioned at a predetermined angle $\theta_2$ where hinge assembly 12 is configured to automatically to prevent further pivotable movement of hinge arm 20 in the direction of arrow 22a until display member 16 is rotatably positioned relative to hinge arm 20 (FIG. 2C) to prevent contact between display member 16 and a working surface 24 of base member 18. For example, if hinge arm 20 is further rotatable in the direction of arrow 22a to an angle less than $\theta_2$ while display member 16 is positioned at an angle $\Phi$ relative to hinge arm 20, a bottom wall 26 of display member 16 may contact and potentially damage display member 16 and/or base member 18. Embodiments of hinge assembly 12 are configured to limit the amount of pivotable movement of hinge arm 20 in the direction of arrow 22a until display member 16 is positioned to prevent such potential damage. In one embodiment, rotation of hinge arm 20 is restricted until angle $\Phi$ is approximately zero degrees or when display member 16 is generally coplanar with hinge arm 20. As used herein, a "closed position" of electronic device 10 shall mean when display member 16 is located in a position substantially parallel and/or coplanar with base member 18 such that display member 16 is disposed in contact with or directly adjacent to working surface 24 of electronic device 10 (FIG. 1). Accordingly, hinge assembly 12 is operable to automatically prevent unwanted and/or potentially damaging contact between display member 16 and base member 18. In addition, hinge assembly 12 facilitates one-handed opening and closing of display member 16 relative to base member 18 such that the user is not required to manipulate and/or orient the screen with two hands while positioning display member 16 relative to base member 18.

Figure 3:
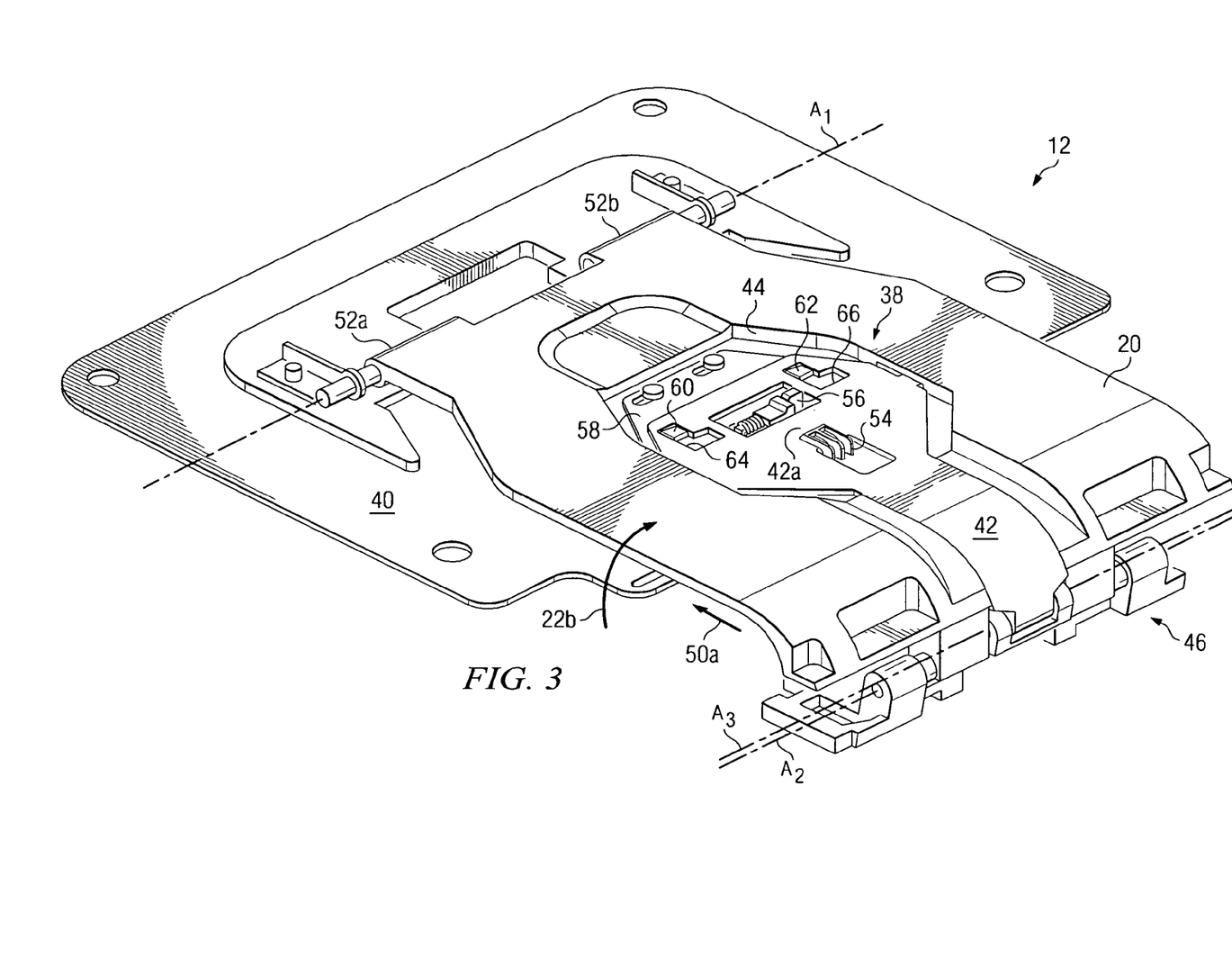
FIG. 3 is a diagram illustrating an embodiment of a hinge assembly of the adjustable display member of FIG. 1 in a locked position.

FIG. 3 is a diagram illustrating an embodiment of hinge assembly 12 of FIG. 1 in the closed position employing a locking system 38 to advantage. In the embodiment illustrated in FIG. 3, hinge assembly 12 comprises hinge arm 20 and a panel mount plate 40. In FIG. 3, panel mount plate 40 is rotatably coupled to hinge arm 20 via hinges 52a and 52b to facilitate pivotable movement about an axis $A_1$. Hinge arm 20 is rotatably coupled to base member 18 (FIGS. 1 and 2A-2D) via a hinge system 46 to facilitate pivotable movement about an axis $A_2$.

In the embodiment illustrated in FIG. 3, locking system 38 is configured to resist pivotable movement of panel mount plate 40, and thus display member 16 (FIGS. 1-2D), relative to hinge arm 20 when hinge arm 20 is positioned at an angle equal to or less than angle $\theta_2$ (e.g. FIGS. 2B-2D). In the embodiment illustrated in FIG. 3, locking system 38 comprises a hook 54 and an extension 56 disposed on panel mount plate 40, a slider plate 42, and a locking plate 58. In FIG. 3, slider plate 42 and locking plate 58 are movable within an opening 44 of hinge arm 20. Locking plate 58 comprises a pair of extensions 60 and 62 extending within/through a pair of corresponding slots 64 and 66 on slider plate 42. In operation, locking system 38 is configured to facilitate pivotable movement of display member 16 relative to hinge arm 20 while hinge arm 20 is positioned between angles $\theta_1$ and $\theta_2$ (FIGS. 1-2B). Furthermore, locking system 38 is configured to resist pivotable movement of display member 16 relative to hinge arm 20 when display member 16 is oriented between the closed position and angles less than or equal to angle $\theta_2$ (FIGS. 2B-2D).

In FIG. 3, hinge arm 20 and offset slider plate 42 are pivotably coupled to base member 18 (FIGS. 1-2D) via a hinge system 46. In FIG. 3, hinge system 46 facilitates pivotable movement of hinge arm 20 about axis $A_2$, and pivotable movement of slider plate 42 about an axis $A_3$. In the embodiment illustrated in FIG. 1, axis $A_2$ is offset and/or generally spaced apart from axis $A_3$ to facilitate relative movement between slider plate 42 and hinge arm 20 when hinge arm 20 is rotated in the direction indicated by arrow 22b. For example, as hinge arm 20 is pivoted in the direction of arrow 22b, the spaced apart relationship of hinge axes $A_2$ and $A_3$ cause slider plate 42 to move within opening 44 relative to hinge arm 20 in the direction of arrow 50a.

Figure 4:
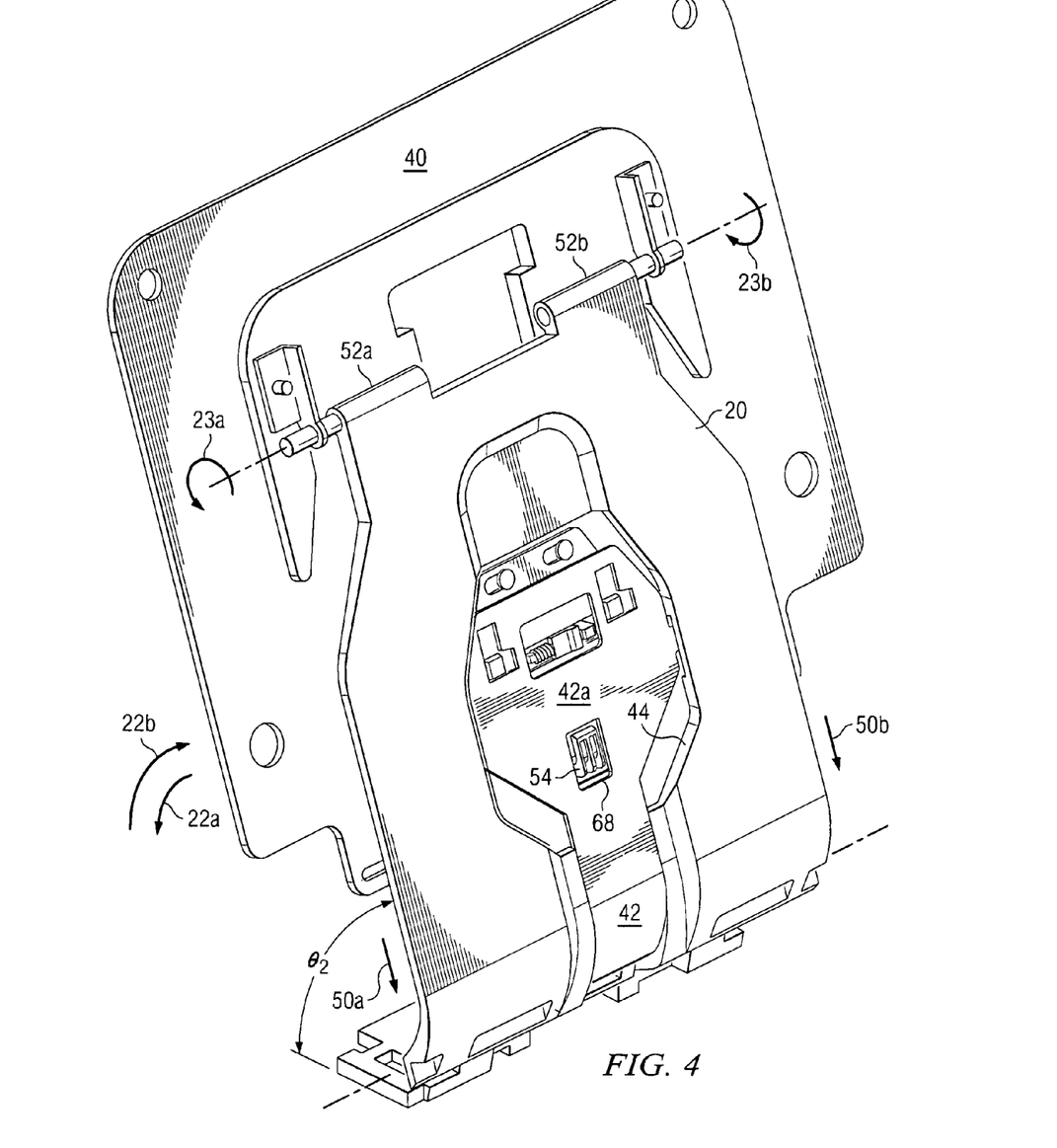
FIG. 4 is a diagram illustrating the hinge assembly of FIG. 3 in an unlocked position.

FIG. 4 is a diagram illustrating locking system 38 in an unlocked position. When locking system 38 is configured in the unlocked position, panel mount plate 40, and thus display member 16, are pivotable relative to hinge arm 20 in the directions of arrow 23a and 23b about axis $A_1$. In the embodiment illustrated in FIG. 4, as hinge arm 20 is rotated in the direction of arrow 22b from the closed position (FIG. 3), slider plate 42 moves relative to opening 44 in the direction of arrow 50a. As slider plate 42 moves relative to slot 44, hook 54 disengages a rear side 42a of slider plate 42 and becomes aligned with an opening 68 disposed on slider plate 42 to facilitate pivotable movement of panel mount plate 40. For example, as hinge arm 20 is rotated from the closed position in the direction of arrow 22b, hook 54 engages rear side 42a of slider plate 42 until hook 54 is positioned within opening 68 to prevent movement of panel mount plate 40 in the direction of arrow 23b. When hinge arm 20 is positioned at angle $\theta_2$, hook 54 is fully disengaged from the rear side 42a of slider plate 42 and aligned with opening 68 to enable pivotable movement of panel mount plate 40 relative to hinge arm 20 in the direction of arrow 23b. Likewise, as hinge arm 20 is rotated in the direction of arrow 22a, slider plate 42 moves within opening 44 relative to hinge arm 20 in the direction of arrow 50b to facilitate engagement of hook 54 with rear side 42a of slider plate 42, thereby resisting and/or otherwise preventing pivotable movement of panel mount plate 40, and thus display member 16, in the direction of arrow 23b.

Figure 5A:
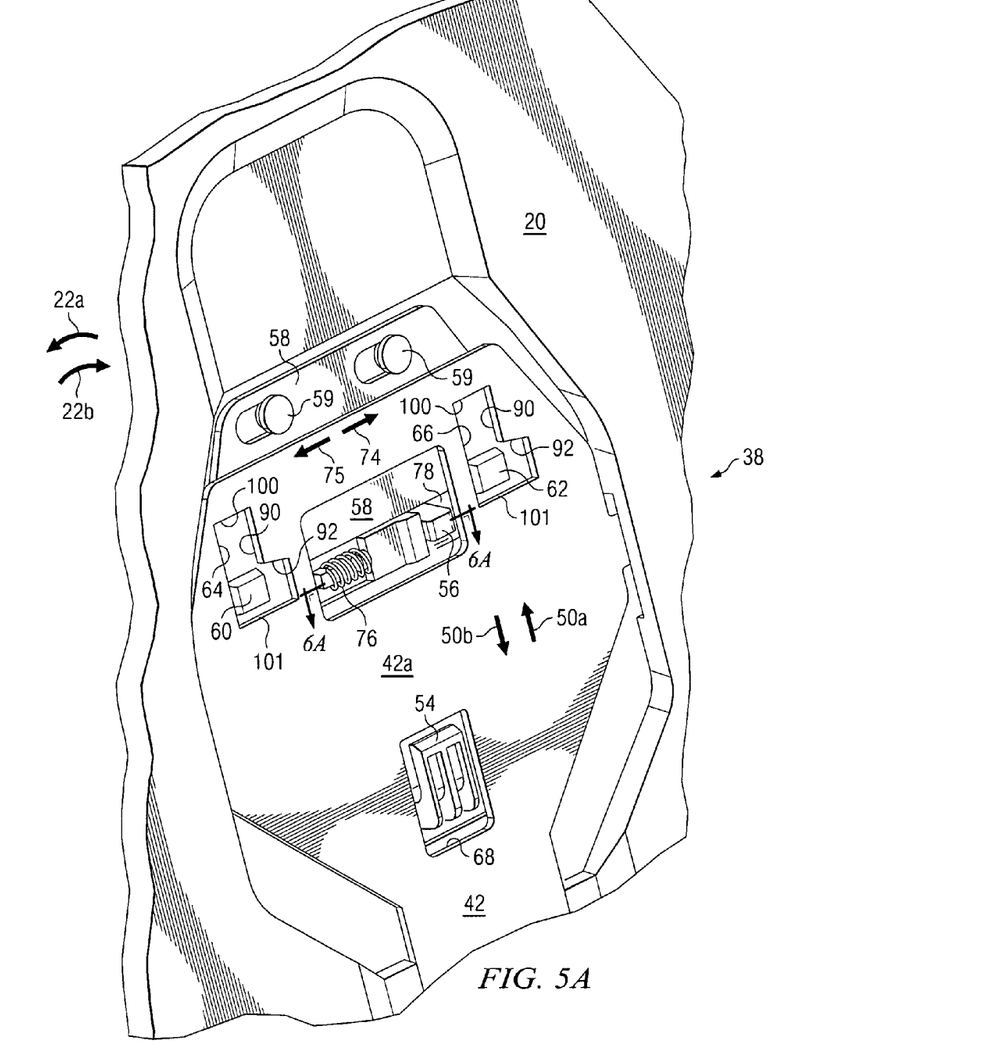
FIGS. 5A-5C are additional diagrams illustrating the hinge assembly of FIGS. 3 and 4.
Figure 5B:
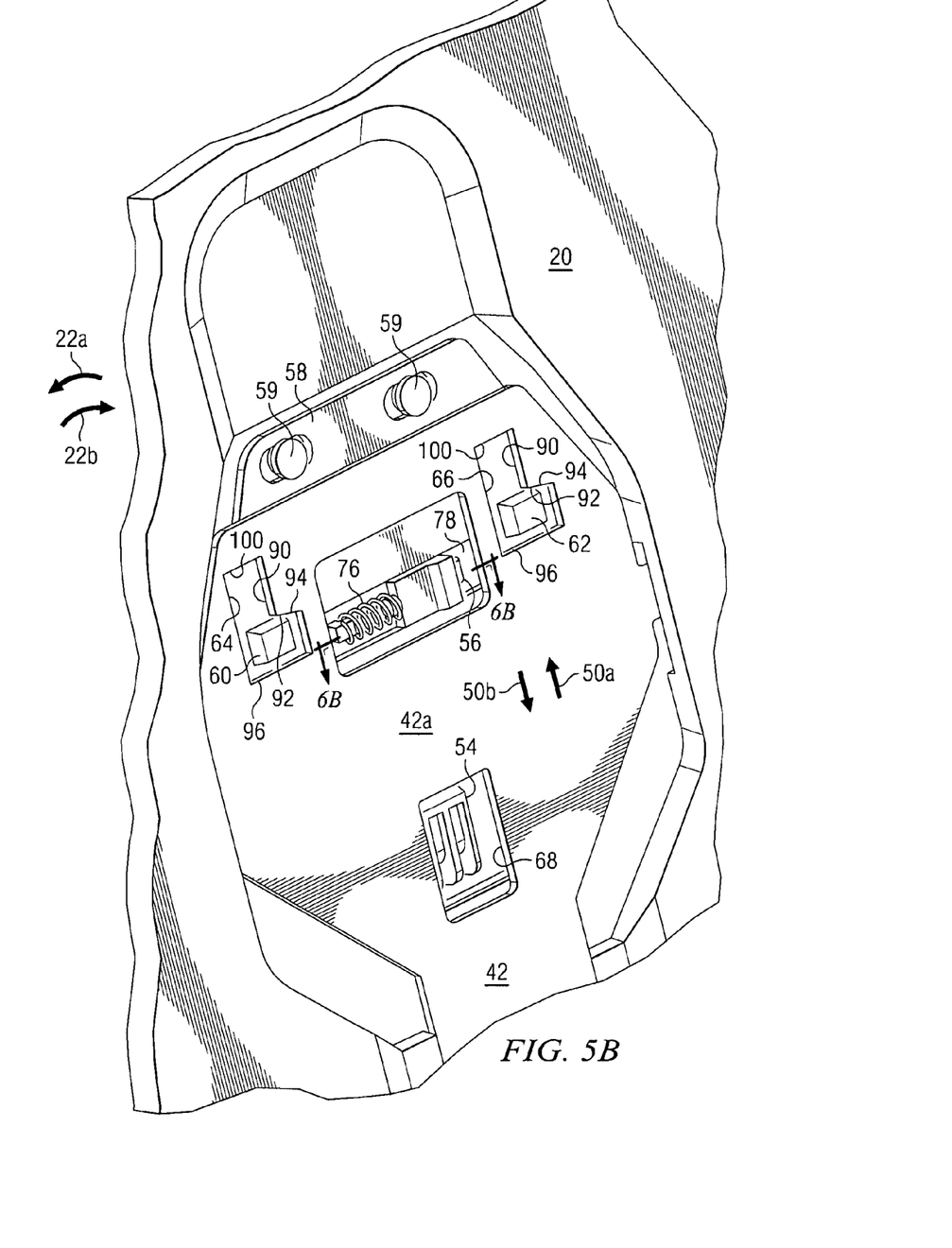
Figure 5C:
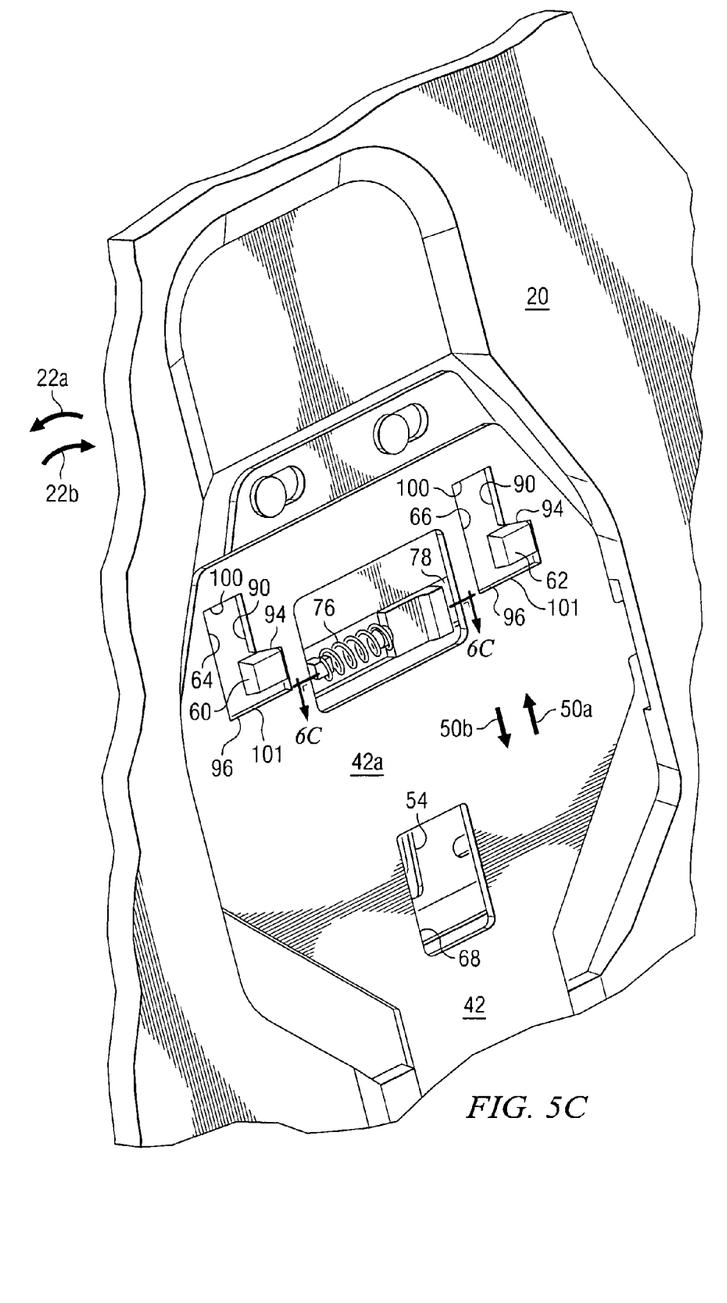

FIGS. 5A-5C are diagrams illustrating locking system 38 of FIGS. 3 and 4. In the embodiment illustrated in FIGS. 5A-5C, locking plate 58 is disposed within opening 44 and is slideably mounted to hinge arm 20. In FIGS. 5A-5C, slider plate 42 and studs 59 secure locking plate 58 within opening 44 such that locking plate 58 is movable in the directions of arrows 74 and 75 relative to opening 44. In the embodiment illustrated in FIGS. 5A-5C, extensions 60 and 62 extend outwardly from locking plate 58 for insertion within slots 64 and 66, respectively. In the embodiment illustrated in FIGS. 5A-5C, slots 64 and 66 are "L" shaped slots comprising a longitudinal slot portion 90 to facilitate movement of hinge arm 20 in the direction of arrows 22a and 22b and a lateral slot portion 92 to prevent movement of hinge arm 20 in the direction of arrows 22a and 22b (FIGS. 1-4) as panel mount plate 40, and thus display member 16, are rotated in the direction of arrow 23b (FIG. 4) away from hinge arm 20.

In operation, in response to movement of hinge arm 20 in the direction of arrow 22b (FIGS. 3 and 4), slider plate 42 moves relative to hinge arm 20 in the direction of arrow 50a causing movement of extensions 60 and 62 relative to slider plate 42 within longitudinal slot portions 90 in the direction of arrow 50b (e.g., movement of extensions 60 and 62 within longitudinal slot portions 90 from an edge 100 toward an edge 101, thereby aligning extensions 60 and 62 with lateral slot portions 92. In addition, such movement of hinge arm 20 in the direction of arrow 22b (FIGS. 3 and 4) positions slider plate 42 such that hook 54 is aligned with opening 68 thereby disengaging the back side of slider plate 42. When hook 54 is aligned with opening 68 and extensions 60 and 62 are align with lateral slot portions 92, locking system 38 is in the unlocked position to enable pivotable movement of panel mount plate 40, and thus display member 16, in the direction of arrow 23b (FIGS. 1 and 4).

Figure 6A:
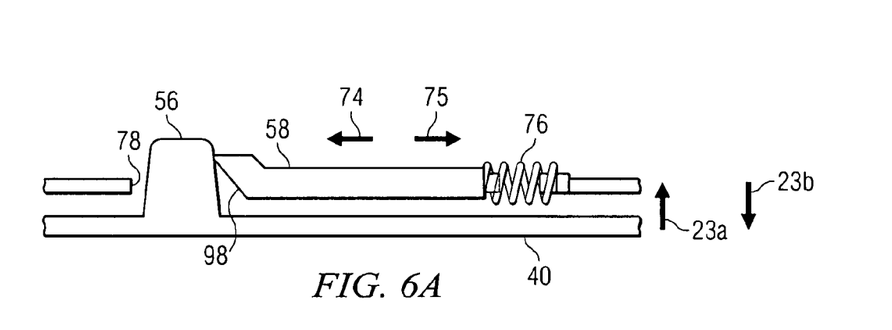
FIGS. 6A-6C are diagrams illustrating a section view of a portion of the hinge assembly of FIGS. 5A-5C taken along the lines 6A-6A of FIG. 5A, 6B-6B of FIGS. 5B and 6C-6C of FIG. 5C, respectively.
Figure 6B:
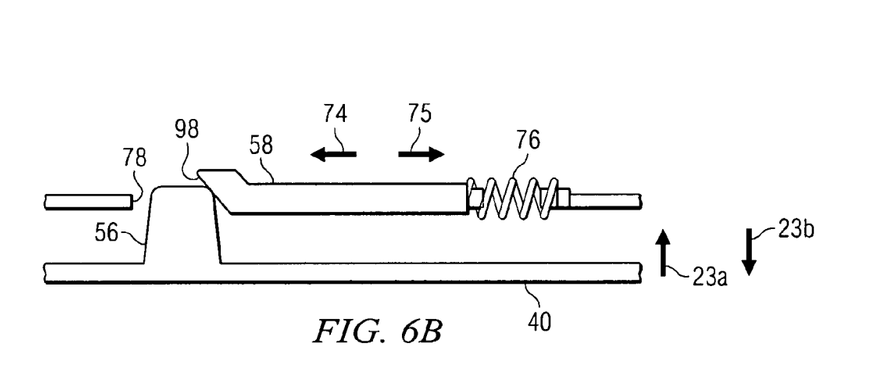
Figure 6C:
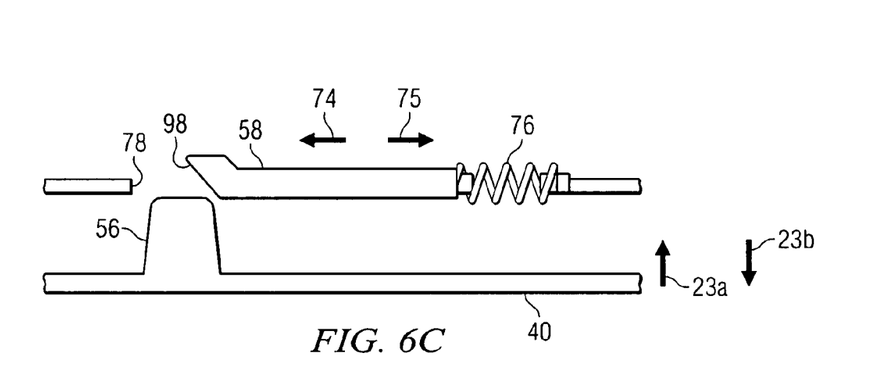

FIGS. 6A-6C are diagrams illustrating a section view of a portion of locking system 38 of FIGS. 5A-5C taken along the lines 6A-6A of FIG. 5A, 6B-6B of FIGS. 5B and 6C-6C of FIG. 5C, respectively. In the embodiment illustrated in FIGS. 5A and 6A, locking plate 58 is biased against extension 56 in the direction of arrow 74 by a biasing mechanism 76. In operation, extension 56 is disposed within an opening 78 disposed on locking plate 58 to compress biasing mechanism 76 and position locking plate 58 such that extensions 60 and 62 are positioned within longitudinal slot portions 90 (FIG. 5A). As panel mount plate 40 is rotated away from hinge arm 20 in the direction of arrow 23b, extension 56 is removed from opening 78 and biasing mechanism 76 exerts a force on locking pate 58 to facilitate movement of locking plate 58 in the direction of arrow 74 (FIGS. 5B and 6B). In the embodiment illustrated in FIGS. 5A-5C, as locking plate 58 moves in the direction of arrow 74, extensions 60 and 62 are positioned within lateral slot portions 92 (FIGS. 5B and 5C). Accordingly, in the event hinge arm 20 is rotated in the direction of arrow 22a, extensions 60 and 62 contact an edge 94 of lateral slot portions 92 to resist movement of hinge arm 20 in the direction of arrow 22a, such as, for example, with angles less than angles $\theta_2$ (e.g., less than seventy degrees relative to base member 18 (FIGS. 2C and 2D). Likewise, an edge 96 of lateral slot portions 92 restricts rotation of hinge arm 20 in the direction of arrow 22b, such as, for example, with angles greater than angle $\theta_1$ (e.g., greater than ninety degrees relative to base member 18)(FIG. 2A). It should be understood that lateral slot portions 90 and 92 may comprise a larger or smaller width and/or extensions 60 and 62 may be larger or smaller to reduce or increase the pivotable range of hinge arm 20 while display member 16 is rotated at any angle $\Phi$ relative to hinge arm 20.

In the embodiment illustrated in FIGS. 5A-6C, when rotating panel mount plate 40 toward hinge arm 20 (e.g., in the direction indicated by arrow 23a (FIGS. 1 and 4)), hook 54 is inserted within opening 68 (FIGS. 5A-5C) and extension 56 is inserted within opening 78 (FIGS. 6A-6C). In FIGS. 6A-6C, as extension 56 is inserted within opening 68, extension 56 slideably engages a sloped sidewall 98 of opening 78 and otherwise forces locking plate 58 in the direction of arrow 75 thereby compressing biasing mechanism 76 and causing extensions 60 and 62 to move relative to lateral slot portions 92. Extensions 60 and 62 move in the direction of arrow 75 until aligned with longitudinal slot portions 90 (FIG. 5A). Once extensions 60 and 62 are aligned with longitudinal slot portions 90, hinge arm 20 is pivotable in the direction of arrows 22a and 22b (FIGS. 2C and 4). Extensions 60 and 62 travel relative to longitudinal slot 90 until extensions 60 and 62 engage edges 100 of longitudinal slots 90 and display member 16 is otherwise in the closed position (FIGS. 2D and 4).

According to some embodiments, hinge system 46 may generate a frictional force different than the frictional force generated hinges 52a and 52b. For example, in the event it is desired that hinge assembly 12 enable rotation of display member 16 without movement of hinge arm 20, the frictional forces generated by hinge system 46 would be greater than the frictional force generated by hinges 52a and 52b. Thus, in the event a user desires to reconfigure display member 16 relative to hinge arm 20 while hinge arm 20 is disposed at an angle θ of eighty degrees, the user may adjust the position of display member 16 relative to hinge arm 20 without causing rotation of hinge arm 20

Electronic device 10 is manufacturing by providing a hinge arm having a display member rotatably coupled to one end thereof, the hinge arm rotatably coupled at an opposite end thereof to a base member and providing a locking system configured to prevent rotation of the hinge arm relative to the base member based on an angular location of the display member relative to the hinge arm. The electronic device 10 may be further manufacturing by coupling a slider plate to the base member and rotatably coupling the hinge arm to the base member about an axis of rotation offset from an axis of rotation of the slider plate. Electronic device 10 may also be manufactured by providing a locking system having a hook engageable with the hinge arm to prevent pivotal movement of the display member relative to the hinge arm. Further, electronic device 10 may also be manufactured to include providing a locking system that comprises providing an extension engageable with the hinge arm to enable pivotal movement of the hinge arm relative to the base member. The method may also comprise providing a locking system configured to enable movement of the display member from an open position to a closed position in response to the display member being positioned coplanar with the hinge arm. The method of manufacturing may also comprise rotatably coupling a panel mount plate to the hinge arm and securing the display member to the panel mount plate. In addition, the method of manufacturing may comprise providing a first hinge having a frictional configuration rotatably coupling the display member to the hinge arm and providing a second hinge rotatably coupling the hinge arm to the base member, the first and second hinges having different frictional configurations. Electronic device 10 may be manufactured by providing the second hinge member having a frictional configuration greater than the frictional configuration of the first hinge.

Thus, embodiments of a hinge assembly 12 are manufactured having a panel mount plate 40 pivotably secured to a pivotable hinge arm 20 to facilitate pivotable movement of display member 16. Hinge assembly 12 further comprises a locking assembly 38 manufactured to prevent damaging and/ or otherwise unwanted contact with working surface 24 of base member 16 when positioning display member 16 relative to base member 18.

What is claimed is:

1. An electronic device, comprising:
   a hinge arm having a display member rotatably coupled to one end thereof, the hinge arm rotatably coupled at an opposite end thereof to a base member; and
   a locking system configured to prevent contact between the display member and the base member by preventing rotation of the hinge arm relative to the base member based on an angular location of the display member relative to the hinge arm.

2. The electronic device of claim 1, further comprising a slider plate rotatably coupled to the base member.

3. The electronic device of claim 2, wherein the hinge arm is rotatably coupled to the base member about an axis of rotation offset from an axis of rotation of the slider plate.

4. The electronic device of claim 1, wherein the locking system comprises a hook to enable engagement with the hinge arm to prevent pivotal movement of the display member relative to the hinge arm.

5. The electronic device of claim 1, wherein the locking system further comprises an extension engageable with the hinge arm to enable pivotal movement of the hinge arm relative to the base member.

6. The electronic device of claim 1, wherein the locking system is configured to enable movement of the display member from an open position to a closed position in response to the display member being positioned coplanar with the hinge arm.

7. The electronic device of claim 1, further comprising a panel mount plate rotatably coupled to the hinge arm, the display member coupled to the panel mount plate.

8. The electronic device of claim 1, further comprising a first hinge rotatably coupling the display member to the hinge arm and a second hinge rotatably coupling the hinge arm to the base member, the first and second hinges having different frictional configurations.

9. The electronic device of claim 8, wherein a frictional configuration of the second hinge is greater than a frictional configuration of the first hinge.

10. A method of manufacturing an electronic device, comprising:
    providing a hinge arm having a display member rotatably coupled to one end thereof, the hinge arm rotatably coupled at an opposite end thereof to a base member; and
    providing a locking system configured to prevent contact between the display member and the base member by preventing rotation of the hinge arm relative to the base member based on an angular location of the display member relative to the hinge arm.

11. The method of claim 10, further comprising coupling a slider plate to the base member.

12. The method of claim 11, further comprising rotatably coupling the hinge arm to the base member about an axis of rotation offset from an axis of rotation of the slider plate.

13. The method of claim 10, wherein providing the locking system comprises providing a hook engageable with the hinge arm to prevent pivotal movement of the display member relative to the hinge arm.

14. The method of claim 10, wherein providing the locking system comprises providing an extension engageable with the hinge arm to enable pivotal movement of the hinge arm relative to the base member.

15. The method of claim 10, further comprising providing a locking system configured to enable movement of the display member from an open position to a closed position in response to the display member being positioned coplanar with the hinge arm.

16. The method of claim 10, further comprising rotatably coupling a panel mount plate to the hinge arm and securing the display member to the panel mount plate.

17. The method of claim 10, further comprising providing a first hinge having a frictional configuration rotatably coupling the display member to the hinge arm and providing a second hinge rotatably coupling the hinge arm to the base member, the first and second hinges having different frictional configurations.

18. The method of claim 17, further comprising providing the second hinge member having a frictional configuration greater than the frictional configuration of the first hinge.

19. An electronic device, comprising:
 a hinge arm means having a display means rotatably coupled to one end thereof, the hinge arm means rotatably coupled at an opposite end thereof to a base means; and
  a means for preventing rotation of the hinge arm means, the preventing means configured to prevent rotation of the hinge arm means relative to the base means based on an angular location of the display means relative to the hinge arm means.

20. The electronic device of claim 19, wherein the means for preventing rotation of the hinge arm means is configured to enable movement of the display means from an open position to a closed position in response to the display means being positioned coplanar with the hinge arm means.

* * * * *